United States Patent

[11] 3,615,272

[72] Inventors Warde T. Collins;
 Cecil L. Frye, both of Midland, Mich.
[21] Appl. No. 773,314
[22] Filed Nov. 4, 1968
[45] Patented Oct. 26, 1971
[73] Assignee Dow Corning Corporation
 Midland, Mich.

[54] CONDENSED SOLUBLE HYDROGENSILSESQUIOXANE RESIN
 9 Claims, No Drawings
[52] U.S. Cl. .................................................. 23/366,
 117/161, 260/37, 260/46.5, 260/448.2, 260/825
[51] Int. Cl. .............................................. C01b 33/04
[50] Field of Search ......................................... 260/46.5,
 46.5 H, 448.2 H; 23/366

[56] References Cited
 UNITED STATES PATENTS
2,827,474  3/1958  Kress .......................... 260/448.2
2,832,794  4/1958  Gordon ........................ 260/448.2
2,844,435  7/1958  Wagner et al. ................ 23/366
2,901,460  8/1959  Boldebuck .................... 260/46.5

OTHER REFERENCES

Muller et al., J. Prakt. Chem. (4) 9, 71 (1959) pp. 71–74 TP1 J89

*Primary Examiner*—Donald E. Czaja
*Assistant Examiner*—M. I. Marquis
*Attorneys*—Robert F. Fleming, Jr., Laurence R. Hobey and Harry D. Dingman

ABSTRACT: Hydrogensilsesquioxane, free of hydroxyl content, of the general formula $(HSiO_{3/2})_n$ where $n$ is an even integer of 10 or more, is disclosed. The condensed hydrogensilsesquioxane is prepared by condensation of trichloro-, trimethoxy- or triacetoxysilanes in a sulfuric acid medium. A specific example is $(HSiO_{3/2})_2$ where $n$ has an average value of 20 or more. This material is a resinous polymer which contains small amounts of volatile oligomers and is useful as a protective coating.

CONDENSED SOLUBLE HYDROGENSILSESQUIOXANE RESIN

This invention relates to completely condensed hydrogensilsesquioxane. In one aspect, the invention relates to a method of preparing hydrogensilsesquioxane which is free of hydroxyl content.

Hydrogensilsesquioxane is known in the art. The prior art is directed to hydrogensilsesquioxane which is not fully condensed, i.e., that which contains at least some end-blocking hydroxyl or alkoxyl groups. Because of this hydroxyl content, the known hydrogensilsesquioxane is susceptible to further condensation and readily forms an insoluble gel when it is attempted to volatize solvents, such as benzene or ether. U.S. Pat. No. 2,901,460 sets forth the state of the art with respect to gelation during hydrolysis reactions.

There in one report of the production of condensed octameric hydrogensilsesquioxane by Muller et al., J. Prakt. Chem., (4) 9 71 (1959). This compound, $(HSiO_{3/2})_8$, was recovered in less than 1 percent yield as the unexpected product of the reaction of trichlorosilane and hexamethyldisiloxane in 80 percent sulfuric acid. A detailed discussion of the cubical structure of the octamer is given by K. Larsson in Arkiv. Chem., 16 215, (1960).

It is an object of the invention to provide completely condensed hydrogensilsesquioxane of relatively high molecular weight.

Another object of the invention is to provide a method of obtaining high yields of completely condensed hydrogensilsesquioxane.

These and other objects of the invention will be apparent to one skilled in the art upon consideration of the following specification and appended claims.

According to the invention there is provided a composition consisting of a hydroxyl-free polymer of the formula $(HSiO_{3/2})_n$ where $n$ is an even integer having an average value of 10 or more.

The hydroxyl-free or completely condensed polymer of the invention is a highly cyclicized material which is soluble in nonpolar organic solvents, such as benzene and hexane. The polymers of the invention include volatile species and higher molecular weight nonvolatile soluble resins. The polymers which are made up of 18 or more hydrogensilsesquioxane units are the nonvolatile resins and are especially useful as coating materials since they can be applied to a substrate from a solution with subsequent evaporation of the solvent to form a resinous film. They can be used to render textiles water repellent and to protect metal surfaces from corrosion. The $(HSiO_{3/2})_n$ compounds can also be added to siloxane elastomers as cross-linking agents. These compounds are contrasted with the prior art hydrogensilsesquioxanes which are not condensed and form gels.

Further, in accordance with the invention, there is provided a method of producing completely condensed hydrogensilsesquioxanes comprising the steps of:

a. adding a solution of trichloro-, trimethoxy-, or triacetoxysilanes in an hydrocarbon solvent to a two-phase reaction medium comprising concentrated sulfuric acid and an aromatic hydrocarbon while mixing the two-phase acid medium to effect condensation of the silanes;

b. washing the reaction mixture with water until substantially neutral;

c. recovering condensed hydrogensilsesquioxanes by evaporation of the hydrocarbon solvent and aromatic hydrocarbon.

Trichlorosilane is the preferred reactant because of its ready availability. Other suitable silanes include triacetoxysilane and trimethoxysilane.

Practice of the above method results in very high, sometimes quantitative, yields of condensed hydrogensilsesquioxane. The method may be practiced in a batch manner or as a continuous reaction. A continuous column reaction-separation technique with recovery and recycle of the acid media is a preferred embodiment of the method.

In order to obtain nearly quantitative yields of the completely condensed polymer, certain factors are critical in the practice of the method. The silane must be in a relatively dilute solution before it is added to the acid medium. Solutions of about 10 weight percent silane in the hydrocarbon solvent are preferred since this solution provides the maximum yield while using the least amount of solvent. Any suitable hydrocarbon which is a solvent for the silane reactant can be used. Exemplary of such solvents are saturated aliphatic hydrocarbons, such as n-pentane, hexane, n-heptane, and isooctane; aromatic and cycloaliphatic hydrocarbons, such as cyclohexane, benzene, toluene and xylene; and halogennated aliphatic and aromatic hydrocarbons, such as trichloroethylene, perchloroethylene, bromobenzene and chlorobenzene.

The rate of addition of the silane solution to the acid medium is also important in obtaining high yields. The rate of addition must be sufficiently slow to avoid any substantial gelation of part of the product. The exact addition rate depends upon the volume of the acid medium and the degree to which the media is mixed. Stirring or other mechanical mixing of the reactants and the two-phase acid media prevents phase separation of the medium and aids in the transport of the silane to the acid, giving rapid dilution of silane in acid phase.

The two-phase reaction medium comprises concentrated sulfuric acid and an aromatic hydrocarbon. While the acid is described as "concentrated," this is meant to include sulfuric acid which contains up to 10 percent water. The industrial grade acid can be utilized in the process. The second component of the two-phase reaction medium is an aromatic hydrocarbon, such as benzene, toluene, xylene and the like. Benzene and toluene are preferred because of their low boiling points which allow them to be easily distilled from the product.

Although the exact reaction mechanism has not been determined, the low concentration of water needed for hydrolysis of the silanes may arise from sulfonation of the aromatic hydrocarbon as shown by the following reaction:

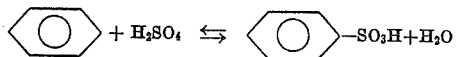

There is a partial hydrolysis of a portion of the silanes to form silanols, $HSiX_2(OH)$, $HSiX(OH)_2$ or $HSi(OH)_3$, with the evolution of HX. The silanes also presumably react initially with the acid phase to form the silylsulfate, silylbisulfate or silylaromaticsulfonate species. These species are believed to condense with the silanol to produce siloxane linkages while regenerating the sulfuric and/or arylsulfonic acid. The dehydrating properties of sulfuric acid also aid in preventing the formation of partial condensates. This mechanism provides for complete condensation to the silsequioxane and precludes the presence of silanol substituents in the polymer product.

In accordance with this explanation, the ratio of sulfuric acid to aromatic hydrocarbon in the two-phase medium is not critical and can be varied with wide limits, so long as a sufficient quantity of water is being generated to react with the silanes added to the medium.

In one embodiment of the method, a quantity of fuming sulfuric acid is added to the reaction medium to consume the bulk of water present in the concentrated sulfuric acid. The arylsulfonic acid can also be added to the reaction medium. When the acid phase is reused or recycled, it has been found that the reaction rate is slower. This difficulty is overcome by the addition of a small quantity of water to the acid phase during recycle or before reuse. This results in the generation of sulfuric acid and prevents the attainment of equilibrium conditions.

The reaction product is a mixture of volatile oligomeric species, i.e., $(HSiO_{3/2})_{8\text{-}16}$, and a nonvolatile resinous polymer. The ratio of volatile oligomers to nonvolatile polymer is dependent upon reaction conditions, such as silane addition rate, sulfuric acid concentration and the like. The reaction conditions also affect the relative amounts of the individual oligomeric species in the volatile fraction of the product. The production of octameric hydrogensilsesquioxane is generally low, for example, less than 1 percent of the product. It is believed that the octamer is not as resistant to acid rearrangement as are the other species and that after a period of time in the strong acid medium, the octamer is rearranged to higher cyclicized species, such as $(HSiO_{3/2})_{16}$. If desired, the proportion of lower molecular weight species in the volatile fraction can be increased by diluting the sulfuric acid with glacial acetic acid. The change in the nature of the product is attributed to the greater effective dilution of the condensing silane and dilution of the sulfuric acid thereby decreasing the acid rearrangement of the octamer.

The following examples are considered illustrative of the invention and are not to be construed as unduly limiting the invention which is properly set forth in the appended claims.

EXAMPLE 1

A solution of 12.7 grams of trichlorosilane in 150 milliliters of benzene was slowly added to a rapidly stirred mixture of 200 milliliters of benzene, 80.3 grams of concentrated sulfuric acid (95–98% $H_2SO_4$), and 60.4 grams of fuming sulfuric acid (15% $SO_3$). The silane addition to the acid medium was carried out over a 6.5 hour period. After completion of the addition, the reaction mixture was poured into a separatory funnel and the acid phase was removed. The benzene phase was washed until neutral to the acid test paper.

During the washing step, difficulty was encountered because of emulsion formation. Benzenesulfonic acid was formed in the reaction mixture and it is believed that the material was acting as a surfactant. This difficulty was overcome by washing with 50 percent sulfuric acid, then with distilled water.

After washing until neutral, the benzene solution was filtered to yield 0.1 gram of insoluble material. The benzene solution was then evaporated to dryness, leaving 4.9 grams (97.8 percent yield) of solid resinous polymer, $(HSiO_{3/2})_n$. This material did not gel during this process and was completely soluble in hexane.

Equivalent results were obtained when this method was performed in a continuous manner using toluene as the aromatic hydrocarbon phase of the reaction medium.

EXAMPLE 2

Several samples of condensed hydrogensilsesquioxane were prepared by the method of example 1. The volatile oligomeric fraction ranged from 9 to 27 percent of the total product. The individual volatile components of this fraction were separated from one another by vapor phase chromatography. A 10-foot chromatographic column, packed with 20 percent trifluoropropyl-methylsiloxane on acid-washed Chromasorb packing material (80–100 mesh), was used. A typical distribution of volatile species was as follows:

| Volatile Oligomer | Molecular Weight | Weight % of Volatile Fraction |
| --- | --- | --- |
| $(HSiO_{3/2})_{10}$ | 530 | 4.2 |
| $(HSiO_{3/2})_{12}$ | 636 | 43.2 |
| $(HSiO_{3/2})_{14}$ | 742 | 36.8 |
| $(HSiO_{3/2})_{16}$ | 848 | 13.5 |

The molecular weights were determined by mass spectrometry. The infrared spectra of the above species shown $2\equiv$ SiH bands at 4.4 and 11.4 microns and a strong narrow Si-O-Si band at 8.8 microns, this latter absorption being characteristic of cage-skeletal silsesquioxane polycyclic structures.

The infrared spectra of the nonvolatile portion of these soluble resin samples were similar to the above with an additional weak siloxane band at 9.0–9.5 microns indicating that the resin is largely of the polycyclic structure with some random noncage structural content.

EXAMPLE 3

A mixture of 2,260 grams of the sulfuric acid phase, recovered from an earlier preparation of this type, and one liter of benzene were added to a 5-liter flask. The contents of the flask were stirred vigorously while adding a solution of 136.5 grams of trichlorosilane in 1.5 liter of benzene. The solution was added to the flask by use of a pressure-compensating dropping funnel under a nitrogen atmosphere. Total addition time was 10.5 hours.

After completion of the addition, the reaction mixture was transferred to a separatory funnel and the acid phase was removed. The benzene phase was then washed with water until neutral to acid test paper. The solution was dried with sodium sulfate and evacuated to dryness. The reacted material was then redissolved in hexane and the solution was evaporated to dryness to yield 53.9 grams of soluble fully condensed hydrogensilsesquioxane.

A sample of the product was found to contain 15.9 percent volatile material by sublimation. The distribution of the volatile species was determined by GLC peak area percentages to be as follows:

| | |
| --- | --- |
| $(HSiO_{3/2})_{10}$ | 12.4% |
| $(HSiO_{3/2})_{12}$ | 48.8% |
| $(HSiO_{3/2})_{14}$ | 35.7% |
| $(HSiO_{3/2})_{16}$ | 3.1% |

EXAMPLE 4

A solution of 10 milliliters of $HSiCl_3$ (0.1 mole) in 150 milliliters of benzene was added over a 5-hour period to a stirred reaction medium of 260 grams of concentrated (95–98%) $H_2SO_4$, 200 grams of fuming $H_2SO_4$ (15–18% $SO_3$) and 200 milliliters of benzene. After 24 hours the benzene phase was washed free of acid and evacuated to dryness. Four grams (75.5% yield) of hexane-soluble product were recovered.

Analysis: Calculated for $(HSiO_{3/2})$: % C., O; H, 1.89; Si, 52.8. Found: % C., 1.52; H, 1.73; Si, 49.2. There was no detectable amount of silanol observed by infrared spectroscopy. The minor carbon content (1.52 percent) indicated the presence of a trace of benzene in the product.

EXAMPLE 5

A solution of 12.9 grams of $HSi(OCH_3)_3$ (0.106 moles) in 150 milliliters of benzene was added over a 5-hour period was added to a stirred mixture of 80.2 grams of concentrated (95–98%) $H_2SO_4$, 59.8 grams of fuming $H_2SO_4$ (15–18% $SO_3$) and 200 milliliters of benzene. After 72 hours, the benzene phase was washed until neutral, filtered and evacuated to dryness to obtain 3.6 grams (68 percent yield) of hexane-soluble hydrogensilsesquioxane.

EXAMPLE 6

A solution of 10 milliliters of $HSiCl_3$ (0.1 mole) in 150 milliliters of benzene was added dropwise over a 3.75-hour period to a stirred mixture of 170 grams of concentrated (95–98%) $H_2SO_4$, 35 grams of benzenesulfonic acid and 200 milliliters of benzene. The benzene phase was washed until neutral and evaporated to dryness to obtain 4.0 grams (75.5% yield) of soluble hydrogensilsesquioxane.

EXAMPLE 7

For purposes of comparison, a solution of 10 milliliters of $HSiCl_3$ in 150 milliliters of benzene was added to a stirred mixture of 177 grams of concentrated (95–98%) $H_2SO_4$ and 200 milliliters of benzene over a 5.5-hour period. Neither fuming sulfuric nor benzenesulfonic acid were added to the reaction medium. After washing and evaporating the benzene, 1.8 grams (34 percent yield) of soluble hydrogensilsesquioxane were recovered. This example demonstrates that the process is operable without the addition of fuming sulfuric or arylsulfonic acid to the two-phase reaction medium. It also demonstrates that enhanced yields are obtained by the addition of these materials.

EXAMPLE 8

A solution of 10 milliliters (0.1 mole) of $HSiCl_3$ in 150 milliliters of benzene was added over a 4-hour period to a stirred reaction medium of 80 grams of concentrated (95–98%) $H_2SO_4$, 60 grams of fuming sulfuric acid (15% $SO_3$), 200 milliliters of glacial acetic acid and 200 milliliters of benzene. The addition of silane reactant to the reaction medium was made after cooling the medium to room temperature.

Analysis of the product, $(HSiO_{3/2})_n$, by GLC showed three volatile species; $(HSiO_{3/2})_8$, $(HSiO_{3/2})_{10}$ and $(HSiO_{3/2})_{-12}$, to be present in an area ratio of 2:2:1. This example demonstrates the effect of glacial acetic acid in increasing the content of lower molecular weight oligomers in the volatile species of the reaction product.

EXAMPLE 9

When a 5 weight percent hexane solution of the nonvolatile resin, $(HSiO_{3/2})_n$, $n$ being 18 or more, is brushed onto the surface of a titanium panel, the adhesion of alkaline iron oxide filled-fluorosilicone sealants to the surface is greatly improved over adhesion of the sealant to an unprimed titanium surface.

EXAMPLE 10

The hydrogensilsequioxane was evaluated in a silicone hydride curing system. The $(HSiO_{3/2})_n$ resin was dissolved in toluene and reacted with a silanol end-blocked polydimethylsiloxane in the presence of a nickel catalyst to form an elastomer base. Specifically, mixture of 7.42 grams of $(HSiO_{3/2})_n$, 117 grams of toluene and 0.5 grams of $NiCl_2$ was heated at 110° C. for 1 hour; after which, 110 grams of silanol end-blocked polydimethylsiloxane (2,200 cs.) fluid were added to the mixture. These quantities of siloxane fluid and $(HSiO_{3/2})_n$ provided a $(HSiO_{3/2})_n$ /≡SiOH ratio of 1:1 in the reaction mixture. The reaction was carried out at 110° C. for 3 hours. The product was filtered and stripped of solvent by heating to 120° C. under a vacuum of 1 mm.-hg.

The product was a 3,600 cs. fluid which was partially end-blocked with ≡SiH groups. Analysis showed a ≡SiH content of 0.088 percent and a ≡SiOH content of 0.11 percent.

One hundred parts by weight of the product were compounded with 30 parts by weight of silica filler and 1 part by weight of dibutyltin dilaurate to form a first elastomer. This elastomer was allowed to cure at room temperature and 50 percent relative humidity. The properties of samples of the elastomer were determined after 1 week and 1 month of curing.

For purposes of comparison, particles of the $(HSiO_{3/2})_n$ resin were blended with the above-described polydimethysiloxane fluid on a three-roll mill. The resin was added in an amount sufficient to provide the 1:1 ratio of $(HSiO_{3/2})_n$ /≡SiOH in the blend. The blend was then compounded with the same amounts of filler and catalyst as used in the above-described preparation to form a second elastomer. This second elastomer was cured and tested in the same manner as the first. Test results are tabulated below:

| Elastomer | Curing time | Shore "A" durometer | Tensile (p.s.i.) | Elongation, percent | Tear strength, 16/in. | 150% modulus (p.s.i.) |
|---|---|---|---|---|---|---|
| 1 | 1 week | 52 | 940 | 350 | 70 | 360 |
|   | 1 month | 52 | 925 | 305 |  | 460 |
| 2 | 1 week | 37 | 575 | 360 | 134 | 220 |
|   | 1 month | 46 | 730 | 300 | 95 | 340 |

This example demonstrates the effectiveness of $(HSiO_{3/2})_n$ in providing cross-linking sites in silicone elastomer formulations.

Reasonable modification variations are within the scope of the invention which sets forth novel condensed hydrogensilsesquioxane compounds and a method for producing the same.

That which is claimed is:

1. A composition of matter consisting of a hydroxyl-free polymer of the formula $(HSiO_{3/2n}$ where $n$ is an even integer having a value of 10 or more, said polymer being soluble in hexane.

2. The composition of claim 1 wherein $n$ has a value of 18 or more, further characterized as a nonvolatile resin.

3. A method of producing hexane-soluble, fully condensed hydrogensilsesquioxane consisting essentially of the steps of:
   a. reacting a silane, selected from the group consisting of trichlorosilane, trimethoxysilane and triacetoxysilane, by adding a solution of said silane in a hydrocarbon solvent to a two-phase reaction medium consisting essentially of concentrated sulfuric acid and an aromatic hydrocarbon, while mixing said reaction medium, to effect hydrolysis and condensation of the silanes therein to hydroxyl-free hydrogensilsesquioxane, said addition of silanes being at a rate sufficiently slow to avoid any substantial gelation of the reaction product;
   b. washing the reaction mixture until substantially neutral; and
   c. recovering condensed hydrogensilsesquioxane by evaporation of the solvent and aromatic hydrocarbon.

4. The method of claim 3 wherein said aromatic hydrocarbon is benzene or toluene.

5. The method of claim 3 wherein said reaction medium consists essentially of concentrated sulfuric acid, fuming sulfuric acid, and benzene.

6. The method of claim 3 wherein said reaction medium consists essentially of concentrated sulfuric acid, an arylsulfonic acid and an aromatic hydrocarbon.

7. The method of claim 3 wherein said silane reactant is $HSiCl_3$.

8. The method of claim 3 wherein said silane solution contains not more than about 10 percent by weight silane.

9. The method of claim 3 wherein said silane is $HSiCl_3$, said hydrocarbon solvent is benzene and said reaction mixture consists essentially of concentrated sulfuric acid, fuming sulfuric acid and benzene.